United States Patent [19]

McClintock

[11] 4,368,725

[45] Jan. 18, 1983

[54] SOLAR ENERGY COLLECTOR

[76] Inventor: Michael McClintock, 162 Commercial St., Boston, Mass. 02109

[21] Appl. No.: 849,521

[22] Filed: Nov. 7, 1977

[51] Int. Cl.³ .............................................. F24J 3/02
[52] U.S. Cl. ................................. 126/432; 126/445; 126/449
[58] Field of Search .............. 126/271, 270, 432, 449, 126/445, 446, 417, 450; 237/1 A; 165/171, 168; 356/74; 350/258, 259, 260, 263, 261, 262, 264, 265

[56] References Cited

U.S. PATENT DOCUMENTS

| | | | |
|---|---|---|---|
| 504,544 | 9/1893 | Heyden | 126/270 |
| 618,280 | 1/1899 | Manning | 350/260 |
| 1,742,861 | 1/1930 | Johnson | 126/271 |
| 2,783,682 | 3/1957 | Swenson | 126/271 |
| 2,888,007 | 5/1959 | Tabor | 126/271 |
| 3,012,294 | 12/1961 | Waldor | 126/270 |
| 3,016,801 | 1/1962 | Michel | 126/271 |
| 3,107,052 | 10/1963 | Garrison | 237/1 A |
| 3,185,034 | 5/1965 | Youngblood, Jr. | 350/263 |
| 3,863,621 | 2/1975 | Schoenfelder | 126/270 |
| 3,897,820 | 8/1975 | Teeter, Jr. | 126/271 |
| 3,936,157 | 2/1976 | Kapany | 126/270 |
| 3,949,732 | 4/1976 | Reines | 126/271 |
| 3,954,326 | 5/1976 | Michaelis | 52/306 |
| 3,981,294 | 9/1976 | Deminet et al. | 126/271 |
| 4,002,159 | 1/1977 | Angilletta | 126/270 |
| 4,020,989 | 5/1977 | Kautz | 126/270 |
| 4,026,268 | 5/1977 | Bartos et al. | 126/271 |
| 4,035,539 | 7/1977 | Luboshez | 350/264 |
| 4,056,090 | 11/1977 | Henriques et al. | 126/271 |
| 4,056,094 | 11/1977 | Rosenberg | 126/271 |
| 4,108,373 | 8/1978 | Chiapale et al. | 126/271 |
| 4,154,219 | 5/1979 | Gupta et al. | 126/271 |

OTHER PUBLICATIONS

Rabl, Ari., "Prisms with Total Internal Reflection as Solar Reflectors", Solar Energy, vol. 19, pp. 555–565, Pergamon Press, 1977.

Primary Examiner—James C. Yeung
Attorney, Agent, or Firm—Robert J. Doherty

[57] ABSTRACT

A solar window which can alternatively act either as a passive solar heat collector or an active solar heat collector. A substantially transparent pair of panels are mounted in opposed position to each other and define a chamber therebetween. When it is desired to admit solar energy to the structure in which the window is mounted, air is permitted to be retained in the chamber and sunlight to pass through the window to thus heat the interior of the structure. When heat is not required in the structure, a second fluid which may be an optically dense solar energy absorbent or reflective fluid is passed through the chamber so as to respectively absorb or reflect the sunlight passing into the chamber, and in this way reduce the amount of solar heat passing through the window, and, in the case of an absorbent fluid, to retain the heat for later use. Pleasing architectural aesthetics or practical advantages in the case of greenhouses may further be obtained by passing colored fluid through the chamber which fluid may additionally achieve the selective absorption of light of certain wavelengths passing through the window. An alternative embodiment of the invention includes providing the inside window panel with grooves adjacent the chamber and disposed at such an angle thereto that radiation in a spectral region in which the material of said window is at least partially transparent attempting to pass outwardly through said window is substantially reflected back into said structure. Accordingly the angle at which the walls of such grooves are disposed must exceed the critical angle to support total internal reflection for the particular materials utilized.

12 Claims, 9 Drawing Figures

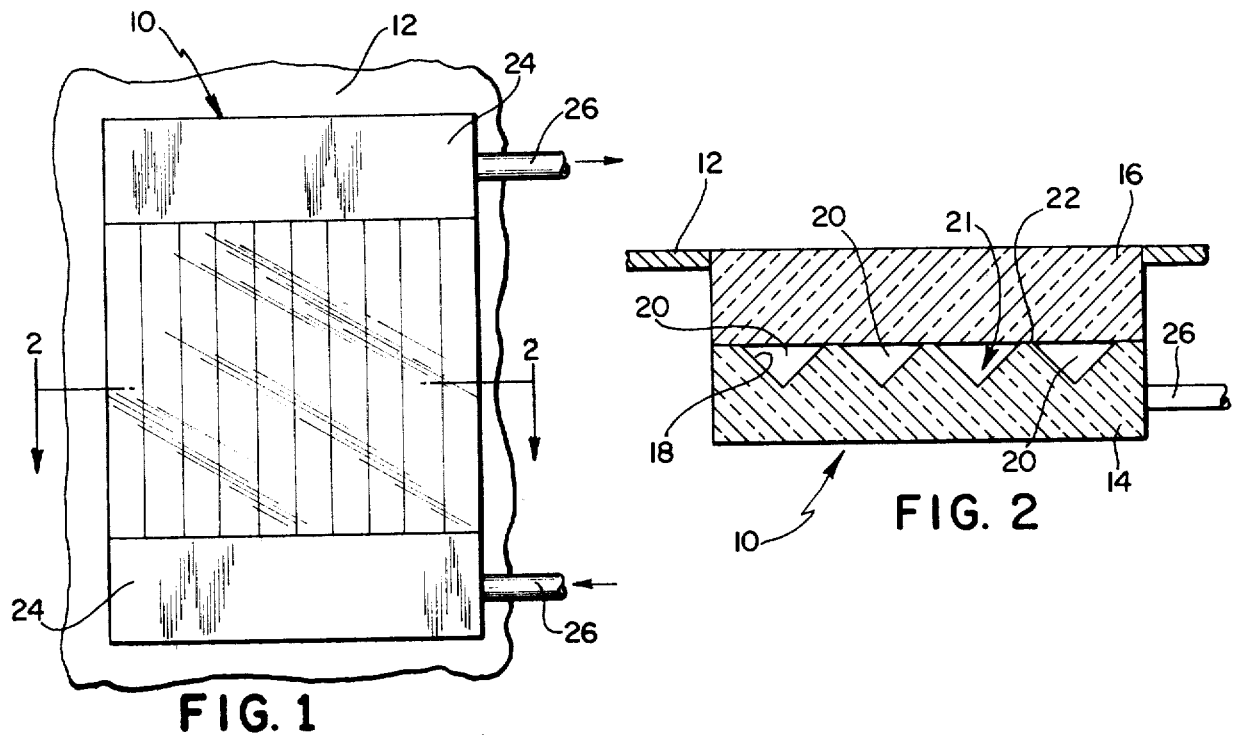
FIG. 1
FIG. 2
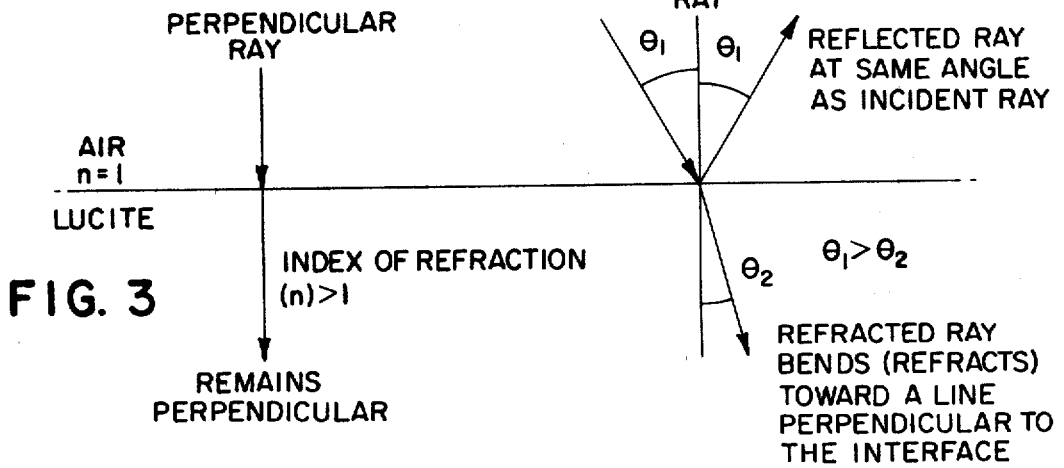
FIG. 3
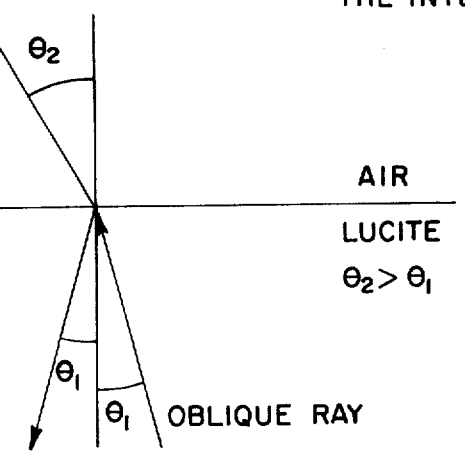
FIG. 3A $\theta_1 > \theta_2$
$\theta_3 < \theta_4$
$\theta_5 > \theta_6$
$\theta_7 < \theta_8$

SOLAR ENERGY COLLECTOR

BACKGROUND OF THE INVENTION

The present invention is directed to a novel solar window which can alternatively be utilized either as a passive solar heat collector or an active solar heat collector. Generally solar heat collectors are of either the active or passive type. An example of a passive solar heat collector would be a conventional window e.g. when the sun is shining such that the light therefrom passes through the window into the house and such light warms the interior of the house. Another example is U.S. Pat. No. 3,832,992 to Trombe wherein a concrete wall is disposed close to a window to accept heat passing therethrough. The wall thickness is such to create a time delay so that heat received through the window is transmitted to the room as during evening hours.

On the other hand, an active device in some manner utilizes a fluid which once heated by the sun's rays is transported to a reservoir for later use in heating the structure. Examples of this latter active type solar heat collector are numerous and include the following U.S. patents:

U.S. Pat. No. 991,161, McHenry, 5/2/11; U.S. Pat. No. 1,888,620, Clark, 11/22/32; U.S. Pat. No. 2,489,751, Candler, Jr., 11/29/49; U.S. Pat. No. 3,107,052, Garrison, 10/15/63; U.S. Pat. No. 3,250,269, Sherock, 6/3/65; U.S. Pat. No. 3,918,430, Stout et al, 11/11/75; U.S. Pat. No. 3,939,819, Minardi, 2/24/76; U.S. Pat. No. 4,026,268, Bartos et al, 5/31/77; U.S. Pat. No. 4,038,967, Stout et al, 8/2/77.

The Minardi and Garrison patents disclose the use of a heat absorptive black or other colored mediums as the mechanism through which the heat is collected. Also Candler, Jr. and Garrison disclose the use of various colored liquid mediums to achieve additive effects including the reflection of light rays away from the collector. It is further known to utilize sunlight reflective surfaces in order to concentrate or otherwise divert solar energy into fluid chambers such as the chamber 42 and receptacle 7 of Sherock and Stout respectively. Such reflective surfaces of Stout and Sherock are respectively indicated by reference numerals 38 and 13. The above patents are believed representative of the prior art and the above citation and discussion thereof constitutes applicant's Prior Art Statement. A copy of each patent is enclosed along with the present application. The need still exists, however, for a solar heat collecting device which can be operated in both passive and active modes in order to overcome the disadvantages of each technique when used by itself, viz., passive systems allow uncomfortable temperature excursions within the heated structure, and active systems use the sun's energy less efficiently when there is a requirement for heat at a time when the sun is shining.

SUMMARY OF THE INVENTION

It is accordingly an object of the present invention to provide a solar heat collector which operates in both active and passive modes in order to use the advantages of each while overcoming their disadvantages, and which further can be utilized to achieve special purposes including pleasing architectural effects.

A still further object of the present invention is the provision of a solar heat collector of the type above-indicated wherein radiation heat losses to the outside are minimized by the reflection of radiation attempting to pass in that direction back into the structure.

These and other objects of the present invention are accomplished by the provision of a pair of at least translucent and generally preferably transparent panels disposed in opposed position with each other so as to define a fluid chamber therebetween. When acting as a passive solar collector the chamber is normally filled with air or is evacuated such that light passing from the outside to the interior serves to heat the interior of the structure. When it is desired to prevent or minimize heat from passing into the structure but to retain such heat for later use, a solar energy absorbent fluid is passed through the chamber so as to absorb the energy passing thereinto. The inner panel is provided with a plurality of grooves the sides of which are disposed towards the chamber at such an angle that when the chamber is filled with air as in the passive operation mode of the device, radiation passing from the inside panel into the chamber is reflected back onto the interior of the structure. The angle at which the groove sidewalls are disposed is such that it exceeds the critical angle of incidence for a portion of this radiation so as to support the optical phenomenon known as total internal reflection.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is an elevational view showing the solar window of the present invention mounted within the wall of a structure such as a house or the like;

FIG. 2 is a partial cross-section of the window taken along the line 2—2 of FIG. 1;

FIG. 3 is a diagram illustrating how radiation passes from a medium of lower index of refraction into a medium having a higher index;

FIG. 3A is a diagram illustrating the reverse of that shown in FIG. 3, namely where radiation passes from a medium of a higher index into a medium having a lower index of refraction;

DESCRIPTION OF THE INVENTION

Figure 4:
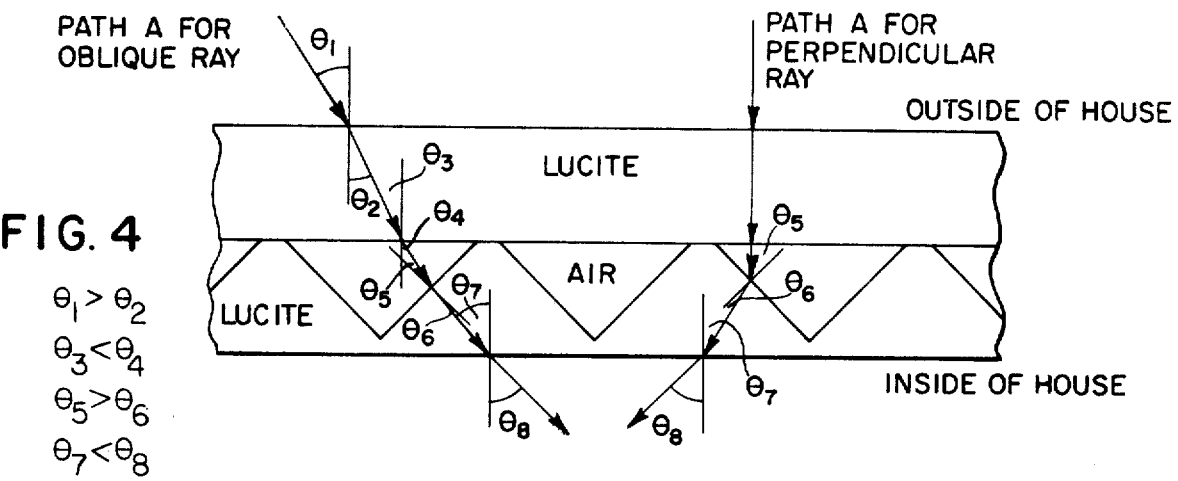
FIG. 4 is a diagram showing how radiation passes inwardly through one embodiment of the solar window of the present invention when the fluid chamber of such window is filled with air.

The solar window 10 of the present invention is mounted in any suitable manner to a wall 12 of a generally enclosed structure (not shown). The window includes an inner panel 14 and an outer panel 16 disposed in opposed position to each other. The inner panel 14 is provided with a series of generally V-shaped grooves which in turn define a plurality of separate channels 20 between the panels 14 and 16. The channels form a fluid chamber 21. The panels contact each other peripherally and at the apices 22 of the V-shaped grooves 18. The grooves 18 and accordingly the channels 20 are preferably vertically disposed such that at the top and bottom portions thereof, they open into header or collection devices 24 suitably connected to a heat reservoir (not shown) by means of suitable pipes 26. In this fashion a suitable liquid such as water may be pumped in the direction of the arrows of FIG. 1 upwardly through the channels 20 from the lower header 24 to the upper header 24 and in this manner assure that the chamber 21 would be gravity filled with such fluid. Obviously, however, other flow paths for such liquid may be provided.

The panels 14 and 16 are preferably formed of transparent materials such that when the window is operated in the passive mode, sunlight may pass through the window from the exterior of the structure to the interior so as to heat the same. Materials suitable not only for their optical characteristics but also because they may be easily fabricated include acrylic plastic materials i.e. Lucite, polyvinyl fluoride materials, polycarbonate materials and polyesters, however, other plastic materials may also be utilized as may glass. Also materials which are not entirely transparent but which are at least translucent may further be utilized.

The interior surface of the outside panels 16 is preferably flat although its configuration does not preclude angular disposition with regard to the first panel 14 or the chamber 21 formed therebetween and is also generally formed of the same or similar materials from which the first panel 14 is formed. Additionally the window 10 may have one or more insulating transparent or translucent panels (not shown) provided outwardly of the outer panel 16 so as to further insulate the window from radiative and conductive heat loss to the outside, such as in my copending application Ser. No. 795,167, filed May 2, 1977. The entire disclosure of such copending application Ser. No. 795,167, U.S. Pat. No. 4,134,389 is hereby specifically incorporated by reference in the subject application. It may further have an additional transparent or translucent cover or covers on the inside to reduce heat transport to the inside at such time as the collector is functioning in the active mode and to reduce heat transfer through the window to the outside of the house or other structures.

In order to insulate the interior of the structure still further from radiant heat loss, the sidewalls of the V-shaped slots or grooves 18 may be disposed at such an angle dependent on the materials utilized for the panel 14 and the particular fluid present within the channels 20 (generally air or evacuated when utilized as a passive solar heat collector) such that for radiation attempting to pass from the structure outwardly through the window the angle of incidence with a line perpendicular to the interface between the groove wall and the chamber will be greater than that angle above which total internal reflection takes place in the spectral region of interest. The optical phenomenon of total internal reflection is defined in the *Handbook of Chemistry and Physics* published by the Chemical Rubber Publishing Company, 36th Edition, page 2836, as follows:

Total reflection —when light passes from any medium to one in which the velocity is greater, refraction ceases and total reflection begins at a certain critical angle of incidence $\theta$ such that $$\sin \theta = 1/n$$

where n is the index of refraction of the first medium with respect to the second. If the second medium is air n has the ordinary value for the first medium. For any other second medium, $$n = n_1/n_2$$

where $n_1$ and $n_2$ are the ordinary indices of refraction for the first and second medium respectively.

Normally a perpendicular ray of light impinging on a material surface as in FIG. 3 passes directly through such material without refraction; however as also illustrated in FIG. 3, a ray of light impinging on such surface at an angle is refracted and such refracted ray of light bends toward a line perpendicular to the interface when passing from air into a medium whose index of refraction, n, is greater than that of air. The reverse as illustrated in FIG. 3A is true for a ray traveling in the opposite direction. Also, normally some light is reflected, some refracted at each interface.

Thus the possibility of creating a condition of total internal reflection exists when radiation attempts to pass from a material such as Lucite having a higher index of refraction into a medium within the chamber 21 such as air having a substantially lower index of refraction in the appropriate spectral region. Referring to FIG. 3A, note that as $\theta_1$ increases eventually $\theta_2$ will be greater than 90° at which point no refracted light will escape from the medium having the higher index of refraction, i.e. Lucite. This is the requirement for total internal reflection (TIR). In order to accomplish such result, the interface surface must be disposed at an angle above the critical angle of incidence to support total internal reflection for such materials. And since the relationship between the angles $\theta_1$ and $\theta_2$ is given by Snell's Law $$n_1/n_2 = \sin \theta_2 / \sin \theta_1$$

the condition for TIR is met when $\theta_1$ equals or is greater than $\sin 1/n_1$. In the case of Lucite having an index of refraction approximately 1.49 and air an index of refraction assumed to be 1, the angle of incidence is approximately 42°. Accordingly, if the sidewalls of the grooves 18 are disposed 45° from the horizontal as shown in FIG. 2 and the included angle of the V-shaped grooves approximates 90°, total internal reflection will take place for radiation striking the first surface of panel 14 approximately 4.5° on either side of a direction normal to the surface.

Figure 4A:
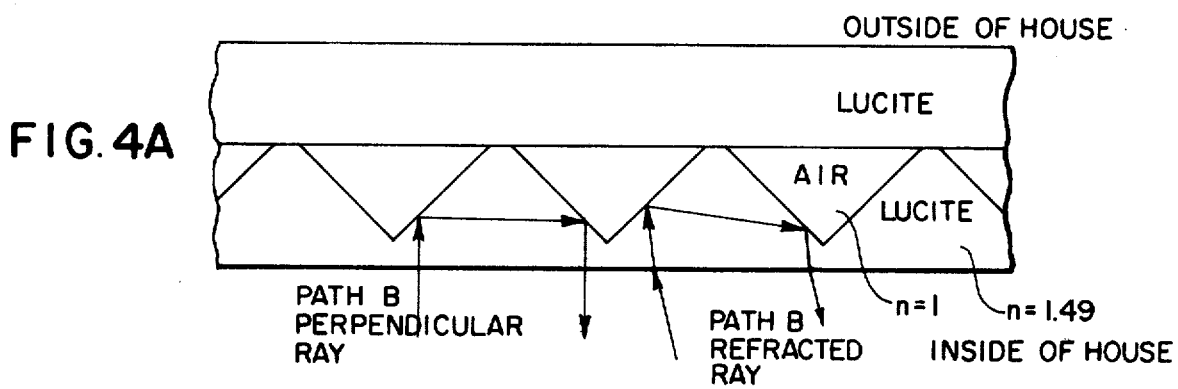
FIG. 4A is a diagram showing how radiation is prevented from passing outwardly of the solar window shown in FIG. 4 by means of total internal reflection.

In operation as a passive solar collector, as when the interior of the structure is relatively cool and the sun is shining, sunlight is permitted to pass directly through the window 10 as illustrated by exemplary lines A of FIG. 4 and accordingly directly heat the interior of the structure. However when radiation attempts to pass outwardly of the window such as to cause radiation heat losses, rays within approximately 4.5° of a plane normal to the first surface will impinge upon the interface between the inner panel 14 and the chamber 21 at an angle greater than the angle of incidence needed to create total internal reflection and accordingly will be reflected back into the inside of the room thus reducing radiation heat losses. The path of such reflected rays is illustrated by exemplary lines B in FIG. 4A.

When the window is desired to be operated as an active solar heat collector, a solar heat absorbent fluid such as water can be passed through the lower header upwardly through the chambers 21 such that light passing into the chamber 21 will be absorbed by the liquid and prevented to a substantial degree from passing through the window and into the interior of the structure. The liquid thus heated may be then pumped to a heat reservoir or collection point remote from the window and utilized at a later time when heat is required in the structure but when the sun is not shining, for instance in the night time. At that time the relatively warm liquid present in the reservoir may be pumped or otherwise cycled through the window and thus utilized as a radiant heat source for the interior of the structure. Various materials may be added to the energy absorbent liquid to increase its ability to absorb solar energy such as suspension of carbon black therein. Other enhanced heat absorptive or black liquids rendered so by dyes or otherwise may also be utilized.

At times it may also be desirable to limit the amount of solar energy entering the house with no need to store heat, and such can be accomplished in the present solar window 10 by passing through the channels 20 liquid which contains white or otherwise reflective particles so as to reflect sunlight attempting to pass through the window inwardly thereof. Such effect would tend to maintain the interior of the structure cooler and could be augmented by the passage of cold or relatively cool liquid through the window, thus creating in effect a water cooled window which would also serve to cool the interior of the structure. Furthermore, various pleasing architectural aesthetic effects could be achieved by the passage or containment of colored or otherwise decorative liquids through or within the chamber 21.

Figure 4B:
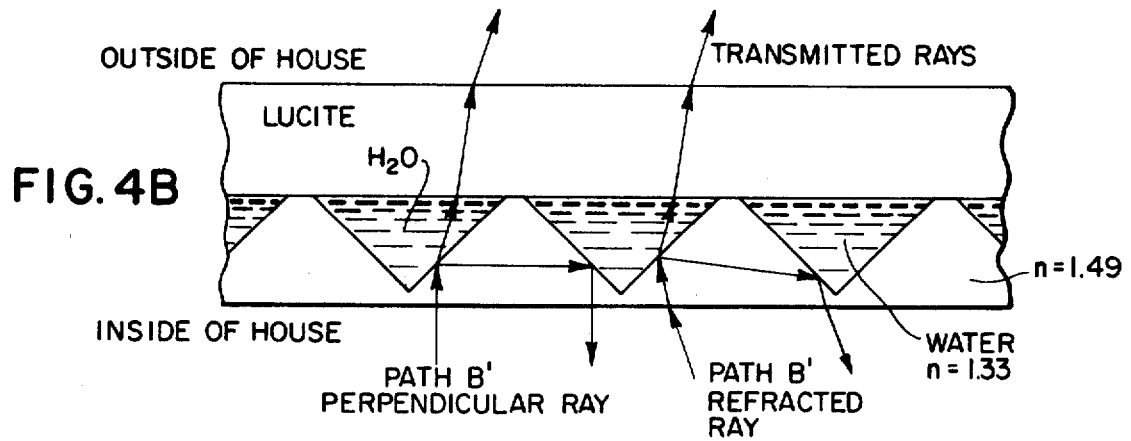
FIG. 4B is a diagram showing the solar window shown in FIGS. 4 and 4A having the fluid chamber thereof filled with a fluid having a greater index of refraction than air but less than that from which the panels are formed and the effect thereof on radiation attempting to pass outwardly thereof.
Figure 4C:
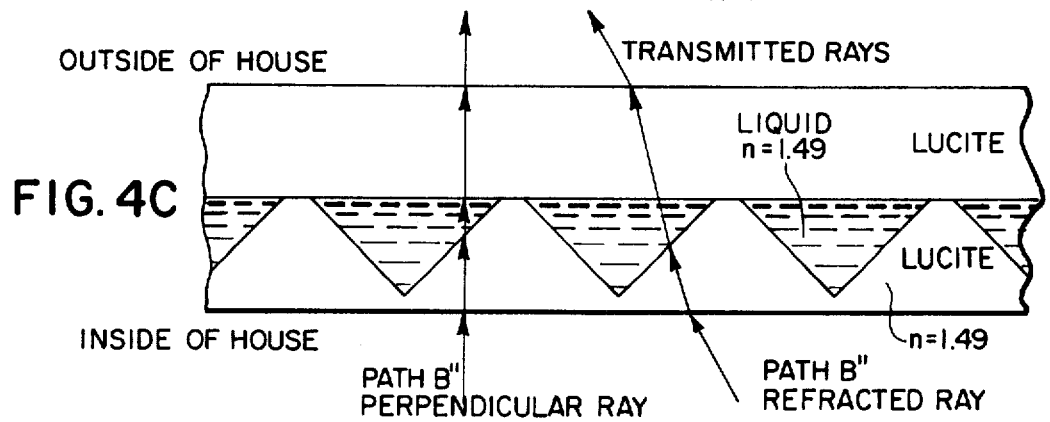
FIG. 4C is a diagram of the solar window shown in FIGS. 4, 4A and 4B having its fluid chamber filled with a fluid having an index of refraction essentially equal to that from which the panels thereof are formed and the effect thereof on radiation passing outwardly thereof.

A specific operational manner of the present device lends itself particularly for use in conjunction with a greenhouse for the growth of plant life. Most plant life uses the compounds chlorophyll A and chlorophyll B to absorb sunlight and ultimately to sustain growth. These compounds generally require light in the 4,000 to 5,000 Angstrom wavelength range as well as in the 6,000 to 7,000 Angstrom range. Accordingly, by selecting a particularly colored liquid which permits passage of light in the above-indicated critical wavelength ranges of the spectrum and absorbing the light of the remaining spectrum, the window can be utilized to drastically limit the amount of solar energy entering a greenhouse, e.g. in the summer months so as to avoid overheating. Furthermore, heat from such unrequired light wavelengths being absorbed in the liquid medium passing through the window could be later recycled as above-indicated to heat the greenhouse such as in the winter months or during the evening. The window above described with grooves in such configuration to achieve total internal reflection of rays attempting passage from the grooved sheet toward the plane sheet, essentially permits the passage of light therethrough primarily in one direction—namely, from the outside in, when the window 10 is being utilized as a passive energy collector. In such cases the fluid chamber contains air rather than the various liquids alternatively discussed. The window 10 can also be made to pass radiation in both directions by the introduction of a material the index of refraction of which is relatively closer to that of the inner panel 14 than that of the air to the extent of removing the condition for total internal reflection above described. A suitable material for such purposes in the visible region of the spectrum is water. Clear water, which has an index of refraction of approximately 1.33, is suitably close to that of the panel 14 (Lucite=1.49) such that the critical angle of incidence required to support total internal reflection is not achieved. When water is present in the chamber, light rays may pass in both directions through the window as shown in FIG. 4B, and when a clear liquid whose optical index of refraction is equal to that of the grooved panel is introduced into the grooves such as in FIG. 4C, light rays are passed through the window without distortion, thus rendering the window clear for observation from the inside of the structure to the outside. A suitable clear liquid having an index of refraction essentially equal to Lucite is an 80% aqueous sucrose solution having an index of refraction of 1.4901. Examples of other such liquids are: 1-iodo octane, 2-amino, 2-ethyl, 1,3 propandiol and isobutyl benzene. However, some of these liquids may not be compatible with Lucite under some conditions; and, accordingly, may not be desirable to use under such conditions or materials other than Lucite selected, in which case appropriate liquids having a similar index of refraction would also be selected to be compatible with such other materials. In some case it may also be beneficial to additionally or alternatively render the outside panel reflective in accordance with the above teachings as when a structure is being maintained cooler than the outside temperature. It should also be pointed out that when materials other than Lucite are utilized for the panels, various other liquids having indices of refraction more suitable for such materials but in accordance with the above described teachings would be utilized in the chamber 21 for the above described purposes.

Figure 5:
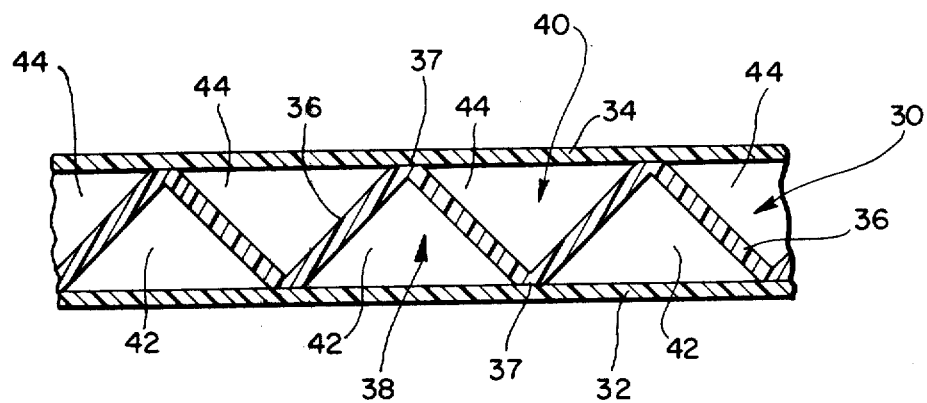
FIG. 5 is a partial cross-sectional view of a modified form of solar window.

Another embodiment of the invention is shown in FIG. 5. Therein, a solar window 30 is shown as having two substantially planar panels or sheets 32, 34 of a transparent or translucent material similar to that utilized for panels 14, 16 of the previously described embodiment, i.e. Lucite, Plexiglass, etc. Sheets 32, 34 are disposed substantially parallel to each other and are maintained in such relative position by an intermediate sheet 36 which is somewhat serpentine in cross-section and may be joined, as by adhesive, to each of the planar sheets at the alternate apices 37 of its angular undulations. The sheets may be of relatively thin-wall construction. In this manner, first and second chambers 38 and 40 respectively are formed between sheets 32, 34 and are formed by a plurality of separate channels 42 and 44 respectively. The angular disposition of the sheet 36 with respect to sheets 32, 34 is about 45°. This solar window may be used in several ways or modes analagous to the previously described solar window 10.

Thus, a first operational mode of window 30 exists when the channels 42 forming chamber 38 contains air or is evacuated and the channels 44 forming chamber 40 contains a circulating energy absorbing or reflecting liquid. The window may then respectively function as a solar collector or a solar reflector for radiant energy incident on the upper, i.e. outside of the device as in window 10 but with the feature of providing additional insulation against the passage of heat from the working fluid within chamber 40 into the region, i.e. the inside of the house or structure, adjoining the lower or inside of the window 30. Such added insulation is formed by the chamber 38.

A second operational mode of window 30 is formed when the upper or outside of the chamber 38 contains a clear liquid such as water, and the chamber 40 is evacuated or contains air. The window then admits and passes radiation incident on the top surface in spectral regions in which the materials of construction and the contained liquid are transparent and reflects by total internal reflection that radiation incident on the bottom surface within the acceptance angle described earlier which meets the conditions for TIR. If the contents of chambers 38 and 40 are interchanged, the window then passes such radiation incident on the lower surface, but reflects radiation incident on the upper surface, that is, the directional character of the panel is reversed as regards its passage or reflection of radiation. Accordingly the window 30 can be utilized alternatively to retain or repel heat dependent on the particular operational demands brought about by seasonal and time of day changes.

If both chambers 38 and 40 are filled with a clear liquid such as water, the window passes radiation in both directions. Also, if both chambers 38 and 40 are filled with a clear liquid whose optical index of refraction is essentially the same as that of the material of which the sheets 32, 34 and 36 are constructed, the window then passes radiation in such a way that the path of a leaving ray of radiation is parallel to that of an entering ray, and objects may be seen clearly through the window without distortion.

It will thus be seen that unique solar windows are disclosed which can provide alternate use as a passive or active solar energy collector and which afford various operational uses which lend themselves to low-cost and efficient heating and cooling of a structure in which such windows are housed. It should also be pointed out that in some instances it may be desirable to utilize the window without providing for the reflection of light rays attempting to escape therefrom through the phenomenon of total internal reflection, and accordingly in such cases the angle of the grooved sidewalls may be such so as to not support the possibility of such reflection. Furthermore the window need not be vertically disposed in a structure, but may be mounted at an angle, as for example in a wall or roof which slants from the vertical, or in place of a skylight. Still further, it may be desired to use the present device as the primary solar energy absorption device within an insulated enclosure as described in my previously identified patent application.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A solar window for use with at least a partially enclosed structure and mounted with respect thereto so as to receive light rays thereon, said window comprising a pair of substantially transparent panels disposed in opposed position to each other and defining at least one fluid receiving chamber therebetween, one of said panels including a plurality of generally parallel grooves having sidewalls disposed at an angle such that light attempting to pass through said window in the direction of said one panel towards said other panel is substantially total internally reflected away from said one panel by means of total internal reflection, and wherein said grooves are formed within said one panel, said one panel formed of a material having a substantially higher index of refraction than that of a first fluid in said chamber, including means for introducing a second fluid into said chamber, said second fluid having an index of refraction closer to that of said one panel such that the critical angle of incidence for said one panel material to support total reflection of radiation passing from said one panel towards said other panel cannot take place such that radiation may freely pass through said window in both directions.

2. The solar window of claim 1, said first fluid being air having an index of refraction of substantially 1.0.

3. The solar window of claim 2, said second fluid being water having an index refraction of about 1.33 and said one panel being formed of an acrylic resin having an index refraction of about 1.49, said grooves (being V-shaped with) having an approximately 90 apex angle and the sides each disposed at about 45.

4. The solar window of claim 2, said second fluid being an aqueous solution of sucrose having an index of refraction of about 1.49 and said one panel being formed of an acrylic resin having an index of refraction of about 1.49, said grooves being V-shaped with an approximately 90° apex angle and the sides disposed at about 45°.

5. The solar window of claim 1 wherein said chamber is evacuated.

6. The solar window of claim 1, said second fluid having an index of refraction essentially equal to that of said one panel such that light rays leave said window on a path parallel to that at which they enter allowing clear viewing of objects through said window.

7. A solar window for use with at least a partially enclosed structure and mounted with respect thereto so as to receive light rays thereon, said window comprising a pair of substantially transparent panels disposed in opposed position to each other and defining at least one fluid receiving chamber therebetween, one of said panels including a plurality of generally parallel grooves having sidewalls disposed at an angle such that light attempting to pass through said window in the direction of said one panel towards said other panel is substantially total internally reflected away from said one panel by means of total internal reflection, and wherein there are two opposed panels and a third panel disposed intermediate thereto, said third panel of undulating configuration defining peaks and valleys and disposed at an angular relation to said two panels so as to form adjacent channels wherein alternate channels form two separate fluid chambers.

8. The solar window of claim 7, wherein said panels are of thin wall sheet material.

9. The solar window of claim 7, wherein said third panel is disposed at an angular disposition with regard to said other panels of approximately 45°.

10. The solar window of claim 7, wherein said channels are substantially V-shaped.

11. The method of regulating the temperature of at least a partially enclosed structure having a solar window mounted with respect to said structure so as to receive the sun's rays thereon, said window including a pair of generally transparent panels disposed in opposed position to each other and defining a fluid chamber therebetween, comprising sensing the temperature inside said structure and alternatively permitting the sun's rays to pass directly through said window where there is a need for heat in said structure proximate said window so that such window functions as a passive solar heat collector and passing a relatively cool optically dense heat absorbent fluid through said chamber wherein said fluid will absorb heat from sunlight passing into said chamber so as to reduce the amount of sunlight and accordingly solar energy passing into said structure and then cycling said fluid from said window to a heat sump when there is no need for heat in said structure proximate said window wherein said window alternatively functions as an active solar heat collector, wherein said fluid is colored so as to selectively permit light of certain wavelengths needed to support plant growth to pass through and so as to absorb light of certain other wavelengths, and wherein said fluid permits entrance of light of those wavelengths in the 4,000 to 5,000 Angstrom and 6,000 and 7,000 Angstrom ranges and generally absorbs light in all other wavelength ranges.

12. The method of regulating the temperature of a generally enclosed structure having a solar window mounted with respect to said structure so as to receive the sun's rays thereon, said window including a pair of generally transparent panels disposed in opposed position to each other and defining a fluid chamber therebetween, the panel mounted proximate the inside of said structure including a plurality of generally parallel grooves and formed of a material having a substantially greater index of refraction than that of the fluid within said chamber, the sidewalls of said grooves being disposed at an angle such that light attempting to pass through said window from the inside out is substantially totally internally reflected into said structure but light impinging on said window from the outside may pass through said window including the step of introducing a second fluid having an index refraction substantially higher than that of said first fluid into said chamber such that light may pass freely through said window in both directions.

* * * * *